(12) United States Patent
Zada et al.

(10) Patent No.: US 9,952,891 B2
(45) Date of Patent: Apr. 24, 2018

(54) ANOMALOUS USAGE OF RESOURCES BY A PROCESS IN A SOFTWARE DEFINED DATA CENTER

(71) Applicant: VMware, Inc., Palo Alto, CA (US)

(72) Inventors: Dan Zada, Herzliya (IL); Noam Peretz, Herzliya (IL); Hilik Paz, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/077,192

(22) Filed: Mar. 22, 2016

(65) Prior Publication Data

US 2017/0277553 A1 Sep. 28, 2017

(51) Int. Cl.
*G06F 9/455* (2006.01)
*G06F 17/30* (2006.01)
*G06F 11/30* (2006.01)
*G06F 9/50* (2006.01)

(52) U.S. Cl.
CPC ........... *G06F 9/45558* (2013.01); *G06F 9/50* (2013.01); *G06F 11/301* (2013.01); *G06F 17/30424* (2013.01); *G06F 2009/45591* (2013.01)

(58) Field of Classification Search
None
See application file for complete search history.

(56) References Cited

U.S. PATENT DOCUMENTS

| 8,015,562 | B2 | 9/2011 | Cibrario Bertolotti et al. |
| 2010/0050172 | A1 | 2/2010 | Ferris |
| 2013/0047039 | A1* | 2/2013 | Manes ................ G06F 11/3409 714/47.1 |
| 2015/0095917 | A1 | 4/2015 | Challenger et al. |
| 2017/0090996 | A1* | 3/2017 | Birke ....................... G06F 9/52 |

OTHER PUBLICATIONS

"Antfarm: Tracking Processes in a Virtual Machine Environment" Stephen T. Jones, Andrea C. Arpaci-Dusseau, and Remzi H. Arpaci-Dusseau Department of Computer Sciences University of Wisconsin, Madison USENIX 2006 Annual Technical Conference Technical Program.

* cited by examiner

*Primary Examiner* — Dong Kim (57) ABSTRACT

The present disclosure is related to systems and methods for analysis of anomalous usage of a resource. An example system can include a plurality of virtual computing instances (VCIs) deployed in a software defined data center and a respective monitoring agent associated with each of the plurality of VCIs. The monitoring agent can be configured to collect information regarding resources used by a plurality of processes running on an associated VCI, maintain a sliding window of top resource users among the plurality of processes, analyze the top resource users among the plurality of processes for anomalous usage of the resources, and take an action in response to the anomalous usage.

20 Claims, 3 Drawing Sheets

ANOMALOUS USAGE OF RESOURCES BY A PROCESS IN A SOFTWARE DEFINED DATA CENTER

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

Multiple VCIs can be configured to be in communication with each other in a software defined data center. In such a system, information can be propagated from an end user to at least one of the VCIs in the system, between VCIs in the system, and/or between at least one of the VCIs in the system and a management server. In some embodiments, the management server can be provided as a VCI. Software defined data centers are dynamic in nature. For example, VCIs and/or various application services, may be created, used, moved, or destroyed within the software defined data center. When VCIs are created (e.g., when a container is initialized), various processes and/or services start running and consuming resources. As used herein, "resources" are physical or virtual components that have a finite availability within a computer or software defined data center. For example, resources include processing resources, memory resources, electrical power, and/or input/output resources.

The processes and/or services can consume large volumes of a resource or resources for a period of time. This can prevent other services from performing as expected, for example, due to resource congestion. As used herein, a "process" is an instance of a particular executable program file that is running. For example, an application (e.g., a program that can be interacted with on the desktop associated with a particular computer or VCI) may require several processes running concurrently to function. As used herein, a "service" is a process that runs in the background and does not interact with the desktop associated with a particular computer or VCI. Accordingly, use of the term "process" herein includes the term "service."

As used herein, an "anomalous process" is a process that is consuming an amount of resources that is greater than a configurable threshold resource consumption value during a configurable period of time and/or is consuming an amount of resources sporadically such that an amount of resources consumed by the process is unpredictable. For example, one or more processes that are running on one or more VCIs in a distributed computing environment can be monitored based on an amount of resources each process is consuming. When one or more of the processes consumes an amount of resources in excess of a configurable resource consumption value (e.g., a threshold) during a configurable period of time, and/or when one or more processes consumes an amount of resource sporadically, the process or processes can be considered to be anomalous. Accordingly, a process that is consuming a large volume of resources for a period of time and/or is consuming an amount of resources sporadically such that an amount of resources consumed by the process is unpredictable can be referred to as an anomalous process. A process that is anomalous may be characterized by an anomalous usage of resources associated with the process and/or may be a process that is consuming an amount of resources sporadically such that the amount of resources consumed by the process is unpredictable.

Resource consumption associated with one or more anomalous processes can be monitored and/or identified. In response to identification and/or monitoring of the anomalous processes, resource consumption associated with the anomalous processes can be analyzed, using various performance metrics, in response to various resource consumption thresholds associated with the different processes being exceeded. As used herein, "monitored" means to observe or track the behavior of something over time. For example, an amount of resources consumed by an anomalous process may be monitored (e.g., tracked) over a period of time. As used herein, "identified" means to single a particular something among a plurality of things. For example, a particular process among a plurality of running processes may be identified (e.g., it may be singled out) as an anomalous process.

In some embodiments, resource consumption associated with the anomalous processes can be remediated. For example, an anomalous process may be terminated in response to various resource consumption thresholds associated with the process being exceeded. In some embodiments, a process can be identified (e.g., detected) as an anomalous process in response to various resource consumption thresholds associated with the process being exceeded, and the anomalous process can then be monitored and/or analyzed. Information regarding the anomalous process can be reported, and/or the anomalous process can be remediated.

Some methodologies for identification, monitoring, and/or analysis of anomalous usage of resources can suffer from a number of shortcomings. For example, identifying a specific anomalous process among many processes that are running on various VCIs in a large-scale software defined data center can be problematic due to the number of processes running and due to the dynamic nature of the software define data center. It can be challenging to identify specific processes as anomalous since only a small number of processes among hundreds or thousands of running processes may be identified as anomalous processes. It can also be challenging to identify specific processes as anomalous because resources can be created and deleted frequently in a software defined data center.

In addition, due to the size and desired scalability of software defined data center, monitoring all (or even a percentage of) running processes can be problematic because large amounts of data may need to be collected and analyzed, sometimes constantly, to identify processes that may be anomalous. Conversely, manually selecting, configuring, and/or monitoring only a single running process, or only portion of running processes can be insufficient, because anomalous processes might not be accounted for, or an incorrect process might be configured, which could impact the operating system associated with one or more of the VCIs in the software defined data center.

As VCIs become increasingly popular and widespread, it can become beneficial to identify and monitor anomalous usage of resources in a software defined data center. For example, it can be beneficial to monitor a list including a number of anomalous processes over time to determine a course of action to take in regard to one or more of the anomalous processes. It can also be beneficial to provide a report (e.g., an indication, an alert, etc.) that a process is consuming an amount of resources such that the process is characterized as an anomalous process. Identifying and monitoring anomalous usage of resources may be relevant to both service providers and customers, for example, for customers who consume virtual computing services and service providers who provide virtual computing services and/or distributed computing environments. Advantageously, embodiments described herein can allow for identification, monitoring, and/or analysis of anomalous usage resources in a distributed computing environment.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Embodiments of the present disclosure are directed to analysis of anomalous usage of resources, for example, in the context of a distributed system including one or more VCIs. In some embodiments, anomalous processes in a distributed computing environment can be continually identified and monitored for performance. For example, a monitoring agent may be deployed manually, or based on an automated distribution policy, to a VCI associated with a distributed computing environment. The VCI may include an operating system (e.g., Linux, Windows®, etc.). The monitoring agent can collect various performance metrics associated with various processes that are running in the distributed computing environment. In some embodiments, the various performance metrics can include processing resource usage, memory resource usage, and/or input/output (I/O) resource usage.

In some embodiments, the monitoring agent can maintain a sliding window of running processes associated with the distributed computing environment. The size of the sliding window and/or the number of processes in the sliding window can be configurable. For example, the monitoring agent can be configured to monitor the top N running processes, where N is a configurable number. In some embodiments, the monitoring agent can be configured to monitor the top N resource users among the running processes. In some embodiments, the top N resource users among the running processes include anomalous processes. Information regarding the processes that is gathered during a configurable period of time can be analyzed locally on an endpoint without being sent to a management VCI. As used herein, an "endpoint" is location in the software defined data center where information that is to be communicated through the software defined data center is generated or terminated. For example, an endpoint can be the operating system that is running on a VCI, or an endpoint can be a container.

In order to alleviate the shortcomings of some approaches, as described above, the information monitored according to the sliding window and/or the number of processes in the sliding window can be limited and can include a minimal amount of information so long as there is enough information to identify a process as anomalous and/or to identify an anomalous usage of resources. In some embodiments, the information monitored for each process in the sliding window can be limited to the name of the process, arguments associated with the process, and a resource consumption associated with the process. As used herein, "arguments" are pieces of data that are passed as input to a function, procedure, or routine associated with performing a specific task in the software defined data center. By limiting the information monitored for each process in the sliding window, scalability may be improved and/or memory space associated with storing information associated with the processes may be conserved or limited. The resource consumption associated with the process can include CPU resource consumption, memory resource consumption, and/or I/O resource consumption.

Figure 1:
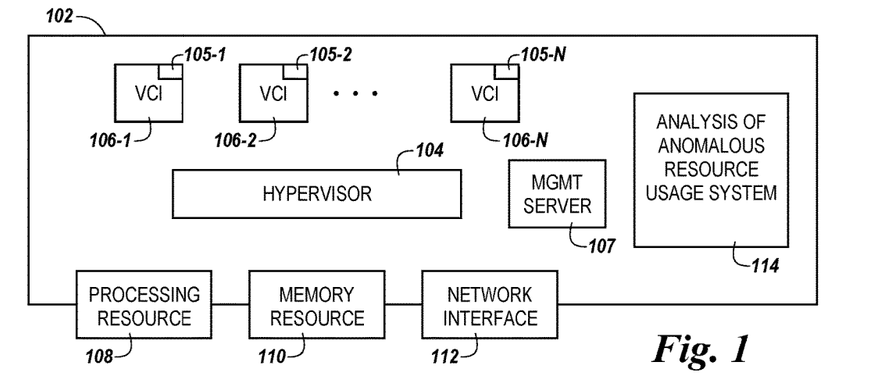
FIG. 1 is a diagram of a host for analysis of anomalous usage of resources according to the present disclosure.

FIG. 1 is a diagram of a host for analysis of anomalous usage of resources according to the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and are not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, a VCI among the number of VCIs can be a master VCI. For example, VCI 106-1 can be a master VCI, and VCIs 106-2, . . . , 106-N can be slave VCIs. The host 102 can be in communication with an analysis of anomalous resource usage system 114. In some embodiments, each VCI 106 can include a respective monitoring agent 105-1, 105-2, . . . 105-N (referred to generally herein as monitoring agents 105) deployed thereon.

In some embodiments, a system including the analysis of anomalous resource usage system 114 can be in communication with a management server 107 (MGMT SERVER 107) configured to allocate resources to a plurality of VCIs 106, monitor the resources allocated to the VCIs, and receive an indication for each of a plurality of anomalous processes running on the plurality of VCIs. In some embodiments, the analysis of anomalous resource usage system 114 can be deployed on (e.g., may be running on) the management server 107, the monitoring agents 105, or a combination thereof. In some embodiments, the management server 107 can be configured to dynamically allocate resources to the plurality of VCIs. For example, the management server 107 can be configured to modify resources that are allocated to the plurality of VCIs 106 in real time to provide resources from a pool of computing resources.

When an anomaly in the consumption of one or more resources associated with the one or more VCIs 106 is identified by a respective agent 105 that can be deployed on each of the respective VCIs 106, the respective monitoring agent 105 can report the information to the management server 107, trigger an alert for an end user, and/or report collected data according to a sliding window to the management server 107. In some embodiments, the respective monitoring agent 105 can report the information to the management server 107 in response to a dynamic or static threshold resource consumption value associated with one or more of the resources being exceeded.

The management server 107 can analyze the information received from the respective monitoring agent 105 by sorting the processes based on a type of resource that is being consumed. For example, the management server 107 can sort the processes received based on an amount of CPU resources being consumed by the process in response to a determination that an alert based on CPU resource usage was raised by the respective monitoring agent 105. Similarly, the management server 107 can sort the processes received based on an amount of memory resources or I/O resources being consumed by the process in response to a determination that an alert based on memory resources or I/O resource usage was raised by the respective monitoring agent 105. In some embodiments, the management server 107 can automatically identify anomalous processes and start to monitor the anomalous processes over time using performance metrics and/or advanced performance metrics. In some embodiments, the management server 107 can monitor the anomalous processes based at least in part on arguments associated with the anomalous processes.

In some embodiments, the management server 107 can continuously monitor the anomalous processes and record information regarding the performance of the anomalous processes. For example, the management server 107 can continuously monitor the anomalous processes without requiring manual configuration, and can provide information regarding the anomalous processes to an end user upon request. In this regard, an end user can be provided with visibility to information regarding the anomalous processes and can investigate the anomalous processes over time using dynamic thresholds, alerts, graphs, etc. In some embodiments, the management server 107 can provide advanced monitoring of anomalous processes that can include monitoring of performance metrics that are sampled at high frequency and/or at high resolution, generating information and/or analysis of the anomalous processes, providing alerts, and/or providing recommendations for how to handle the anomalous processes. In some embodiments, this advanced monitoring of anomalous processes can allow an end user to identify performance issues in advance, and can allow the system or end user to predict the behavior of how the anomalous processes will perform over time.

In some embodiments, the plurality of VCIs 106 can be deployed in a software defined data center and a respective monitoring agent 105 can be associated with each of the plurality of VCIs 106. The respective monitoring agents 105 can be configured to collect information regarding resources used by a plurality of processes running on the associated VCI and maintain a sliding window of top resource users among the plurality of processes. In some embodiments, the monitoring agents 105 can be configured to analyze the top resource users among the plurality of processes for anomalous usage of the resources and take an action in response to the anomalous usage. For example, the monitoring agents 105 can be configured to report the anomalous usage to a management server 107 associated with the software defined data center. In some embodiments, the action can include reporting the collected information regarding resources used by the top resource user associated with the anomalous usage to the management server 107. In at least one embodiment, the action can include reporting the collected information regarding resources used by the top resource users in the sliding window to the management server 107. In some embodiments, the action can include reporting the anomalous usage to an end user.

In some embodiments, the management server 107 can be configured to further analyze the collected information, and report a result of the further analysis to an end user. The further analysis can include sorting the plurality of processes that exhibit anomalous usage based, at least in part, on an amount of processing resources consumed by each process that exhibits anomalous usage among the plurality of processes. For example, the plurality of processes that exhibit anomalous usage can be sorted in decreasing order from a process that consumes a highest amount of processing resources to a process that consumes a least amount of processing resources. In some embodiments, the further analysis can include analyzing at least an amount of processing resources consumed, an amount of memory resources consumed, and an amount of input/output resources consumed.

In some embodiments, the analysis of anomalous resource usage system 114 can include a combination of software and hardware, or the analysis of anomalous resource usage system 114 can include software and can be provisioned by processing resource 108. An example of the alerting with duplicate suppression system is illustrated and described in more detail with respect to FIG. 2.

Figure 2:
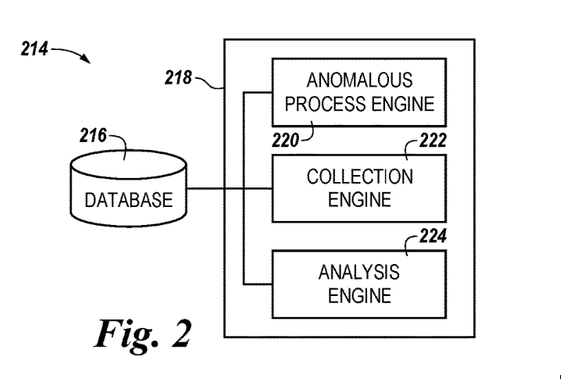
FIG. 2 is a diagram of a system for analysis of anomalous usage of resources according to the present disclosure.

FIG. 2 is a diagram of a system for analysis of anomalous usage of resources according to the present disclosure. The system 214 can include a database 216, a subsystem 218, and/or a number of engines, for example anomalous process engine 220, collection engine 222, and/or analysis engine 224, and can be in communication with the database 216 via a communication link. The system 214 can include additional or fewer engines than illustrated to perform the various functions described herein. The system can represent program instructions and/or hardware of a machine (e.g., machine 326 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines (e.g., 220, 222, 224) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the anomalous process engine 220 can include a combination of hardware and program instructions that can be configured to allocate resources to a plurality of VCIs, monitor the resources allocated to the VCIs, and receive an indication for each of a plurality of anomalous processes running on the plurality of VCIs. For example, anomalous process engine 220 can be configured to receive information about processing, memory, and/or input/output resource consumption associated with an anomalous process.

The collection engine 222 can be configured to collect resource consumption metrics associated with the plurality of anomalous processes in response to the indication. The resource consumption metrics (e.g., performance metrics) can include processing resource consumption, memory resource consumption, and input/output (I/O) resource consumption. In some embodiments, the collection engine 222 can be configured to collect advanced performance metrics, wherein advanced performance metrics can include a measure of how often an anomalous process among the plurality of anomalous processes is consuming resources and how often the anomalous process among the plurality of anomalous processes is not consuming resources.

In some embodiments, the analysis engine 224 can be configured to maintain a sliding window of top resource consumed by the plurality of anomalous processes and/or analyze the plurality of anomalous processes. The analysis engine 224 can be configured to monitor the plurality of anomalous processes to determine if the processes continue to be anomalous over time. In some embodiments, the analysis engine 224 can be configured to analyze processes that are similar to anomalous processes among the plurality of anomalous processes to determine if the processes that are similar are anomalous. For example, processes that are related to an application associated with an anomalous process may be identified and/or analyzed to determine if they are anomalous as well. In some embodiments, the analysis engine 224 can be configured to query an agent (e.g., monitoring agent) associated with a software defined data center to request information about the processes that are similar to the anomalous processes.

Figure 3:
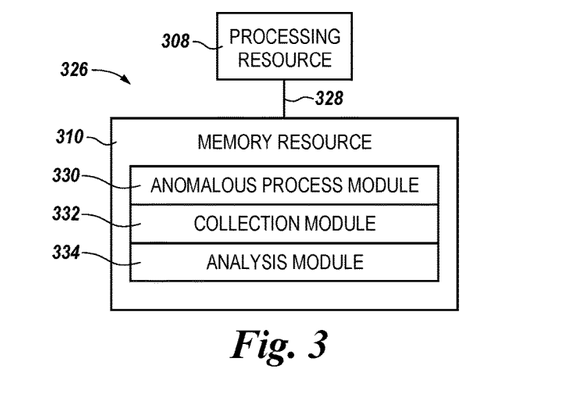
FIG. 3 is a diagram of a machine for analysis of anomalous usage of resources according to the present disclosure.

FIG. 3 is a diagram of a machine for analysis of anomalous usage of resources according to the present disclosure. The machine 326 can utilize software, hardware, firmware, and/or logic to perform a number of functions. The machine 326 can be a combination of hardware and program instructions configured to perform a number of functions (e.g., actions). The hardware, for example, can include a number of processing resources 308 and a number of memory resources 310, such as a machine-readable medium (MRM) or other memory resources 310. The memory resources 310 can be internal and/or external to the machine 326 (e.g., the machine 326 can include internal memory resources and have access to external memory resources). In some embodiments, the machine 326 can be a VCI, for example, the machine 326 can be management server. The program instructions (e.g., machine-readable instructions (MRI)) can include instructions stored on the MRM to implement a particular function (e.g., an action such as analysis of anomalous usage of resources). The set of MRI can be executable by one or more of the processing resources 308. The memory resources 310 can be coupled to the machine 326 in a wired and/or wireless manner. For example, the memory resources 310 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 328. The communication path 328 can be local or remote to the machine 326. Examples of a local communication path 328 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 328 can be such that the memory resources 310 are remote from the processing resources 308, such as in a network connection between the memory resources 310 and the processing resources 308. That is, the communication path 328 can be a network connection. Examples of such a network connection can include a local area network (LAN), wide area network (WAN), personal area network (PAN), and the Internet, among others.

As shown in FIG. 3, the MRI stored in the memory resources 310 can be segmented into a number of modules 330, 332, 334 that when executed by the processing resources 308 can perform a number of functions. As used herein a module includes a set of instructions included to perform a particular task or action. The number of modules 330, 332, 334 can be sub-modules of other modules. For example, the collection module 332 can be a sub-module of the anomalous process module 330 and/or can be contained within a single module. Furthermore, the number of modules 330, 332, 334 can comprise individual modules separate and distinct from one another. Examples are not limited to the specific modules 330, 332, 334 illustrated in FIG. 3.

Each of the number of modules 330, 332, 334 can include program instructions and/or a combination of hardware and program instructions that, when executed by a processing resource 308, can function as a corresponding engine as described with respect to FIG. 2. For example, the anomalous process module 330 can include program instructions and/or a combination of hardware and program instructions that, when executed by a processing resource 308, can function as the anomalous process engine 220, the collection module 332 can include program instructions and/or a combination of hardware and program instructions that, when executed by a processing resource 308, can function as the collection engine 222, and/or the analysis module 334 can include program instructions and/or a combination of hardware and program instructions that, when executed by a processing resource 308, can function as the analysis engine 224.

Figure 4:
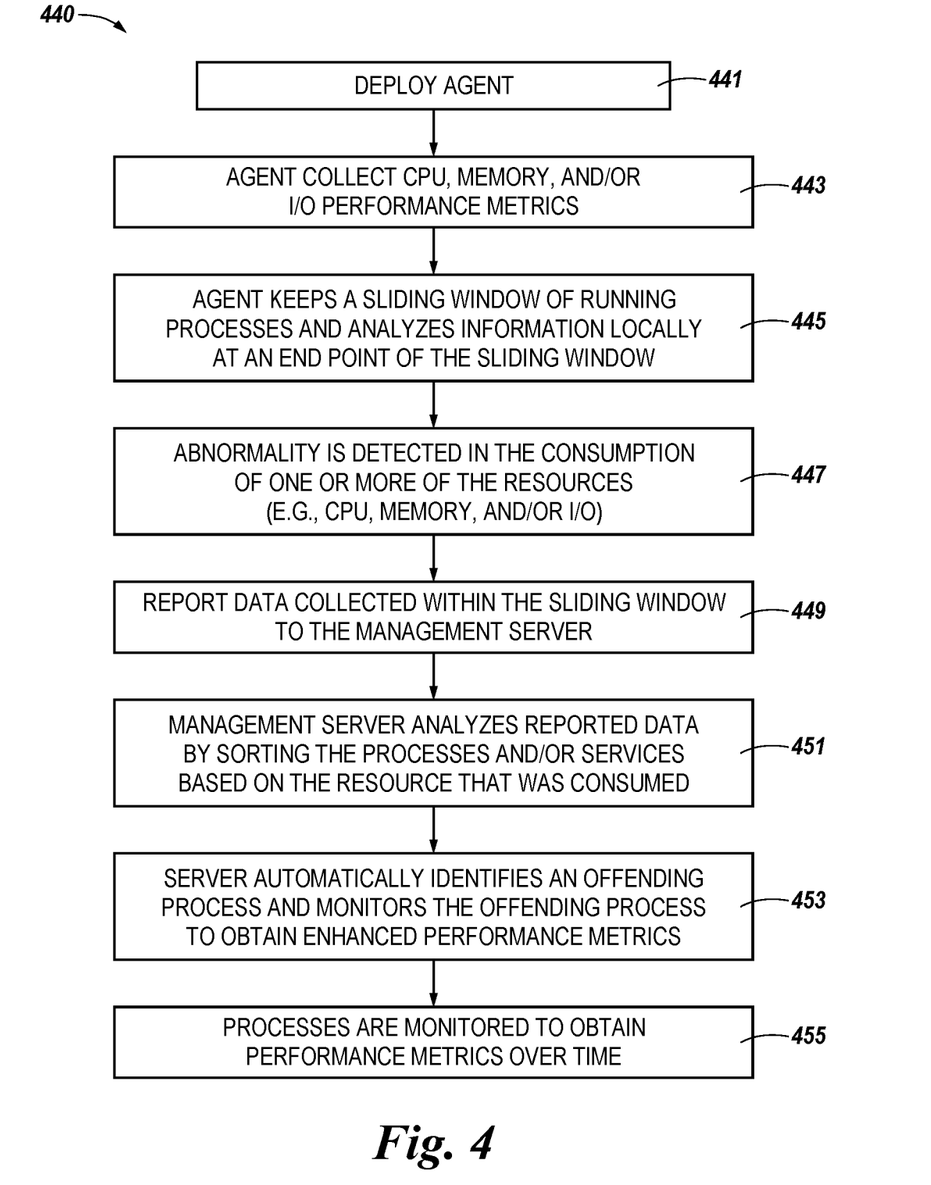
FIG. 4 is a flow chart illustrating analysis of anomalous usage of resources according to the present disclosure.

FIG. 4 is a flow chart illustrating analysis of anomalous usage of resources according to the present disclosure. At block 441, a monitoring agent can be deployed in a software defined data center. The monitoring agent can be an agent VCI, and/or a respective agent VCI that can be associated with each of a plurality of VCIs in a software defined data center. At block 443, the monitoring agent can collect performance metrics associated with resources or processes that are running on the plurality of VCIs. For example, at block 443, the monitoring agent can collect information regarding CPU resource usage, memory resource usage, and/or I/O resource usage associated with resources or processes that are running on the plurality of VCIs.

At block 445, the respective monitoring agents can maintain a sliding window of running processes and can analyze information related to the running processes locally at an endpoint of the sliding window. At block 447, an anomaly (e.g., an abnormality) can be identified in the consumption of one or more resources that are being consumed. For example, anomalies in resource consumption associated with CPU resource usage, memory resource usage, and/or I/O resource usage can be identified.

In some embodiments, anomalies in resource consumption may be identified by a respective monitoring agent in the software defined data center. The respective monitoring agent can report the anomalous consumption of resources to a management server associated with the software defined data center. In some embodiments, in response to a report of anomalous consumption of resources to the management server from a respective monitoring agent, the management server can add the anomalous process associated with the anomalous consumption of resources to other monitoring agents. For example, after a respective management agent has identified an anomalous process, the respective management agent can send information regarding the anomalous process to the management server, and the management server can populate other monitoring agents in the software defined data center with the anomalous process. In this regard, a monitoring agent may be able to monitor an anomalous process that was identified by another monitoring agent in the software defined data center.

At block 449, data collected according to the sliding window can be reported to a management server that is in communication with the plurality of VCIs and/or respective monitoring agents. At block 451, the management server can analyze the reported data by sorting the processes based on the resource that was consumed. For example, the management server can sort the reported data based, at least in part, on resource consumption associated with CPU resource usage, memory resource usage, and/or I/O resource usage.

At block 453, the management server can automatically identify an anomalous (e.g., offending) process and can monitor the anomalous process to obtain enhanced performance metrics associated with the anomalous process. For example, the management server can obtain information regarding an amount of memory paging, how frequently or how many times a process is running versus not running, etc. At block 455, the management server can monitor the anomalous processes over time to obtain time-based performance metrics.

Figure 5:
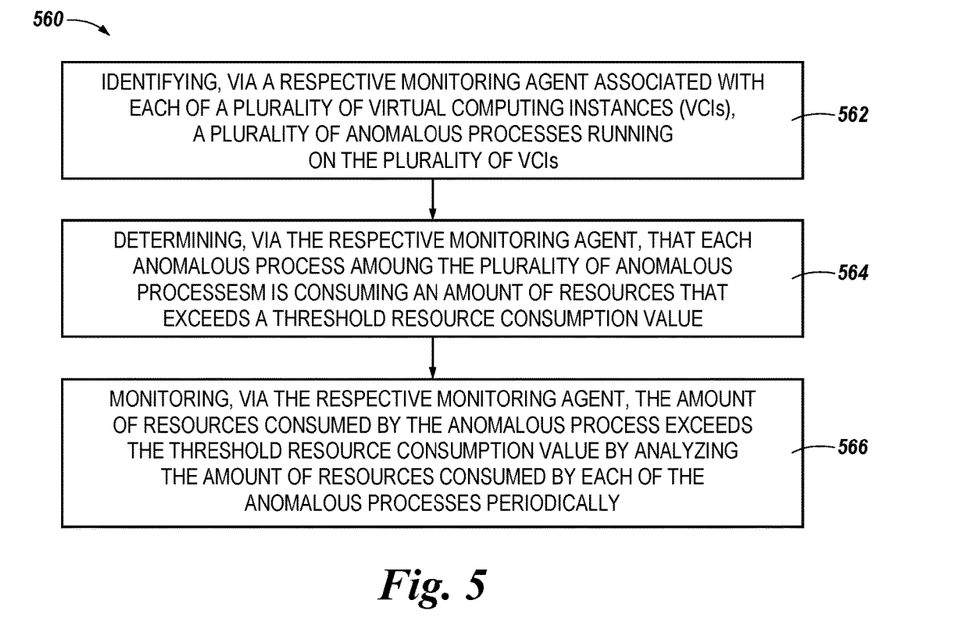
FIG. 5 is a flow chart illustrating a number of methods for analysis of anomalous usage of resources according to the present disclosure.

FIG. 5 is a flow chart illustrating a number of methods for analysis of anomalous usage of a resource according to the present disclosure. At 562, the method 560 can include identifying, via a respective monitoring agent associated with each of a plurality of virtual computing instances (VCIs), a plurality of anomalous processes running on the plurality of VCIs. At 564, the method 560 can include determining, via the respective monitoring agent, that each anomalous process among the plurality of anomalous processes is consuming an amount of resources that exceeds a threshold resource consumption value.

At 566, the method 560 can include monitoring, via the respective monitoring agent, the amount of resources consumed by each of the anomalous processes in response to the determination that the amount of resources consumed by the anomalous processes exceeds the threshold resource consumption value by analyzing the amount of resources consumed by each of the anomalous processes periodically.

In some embodiments, the method 560 can include monitoring, via the monitoring agent, the amount of resources consumed by the anomalous process by analyzing at least one performance metric associated with the amount of resources consumed by the anomalous process. As described above, the at least one performance metric can include information regarding CPU resource usage, memory resource usage, and/or I/O resource usage associated with resources or processes that are running on the plurality of VCIs.

In some embodiments, the method 560 can include ranking each anomalous process based, at least in part, on the amount of resources consumed by each anomalous process. The method 560 can include providing information associated with the amount of resources consumed by each anomalous process to a management VCI that is in communication with each of the respective monitoring agents. In some embodiments, the method 560 can providing, via the management agent, information associated with at least one anomalous process to a monitoring agent that is different than the respective monitoring agent that provided the information associated with the at least one anomalous process to the management VCI. For example, the management VCI can receive information regarding an anomalous process from a respective monitoring agent, and provide the information regarding the anomalous process to other monitoring agents in communication with the management VCI.

In some embodiments, the method 560 can include storing, for each of the anomalous processes, a process name, at least one argument associated with the process, and an amount of resources consumed by the process. In some embodiments, the method 560 can include analyzing processes that are similar to the anomalous processes to determine if the processes that are similar to the anomalous processes are anomalous.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed:

1. A system, comprising:
    a plurality of virtual computing instances (VCIs) provisioned with a plurality of computing resources and deployed in a software defined data center that are ultimately executed on hardware; and
    a respective monitoring agent comprising a processing resource and ultimately executed on hardware associated with each of the plurality of VCIs, wherein the monitoring agent is configured to execute instructions to:
        collect information regarding resources used by a plurality of processes running on an associated VCI, wherein the information regarding the resources used includes a name of the process, an argument associated with the process, and a resource consumption associated with the process;
        maintain a sliding window of top resource users among the plurality of processes, wherein the sliding window includes the information regarding the resources for each of the top resource users;
        analyze the top resource users among the plurality of processes to determine that a process among the plurality of processes is an anomalous process, wherein the anomalous process is a process that is consuming an amount of resources that is greater than a threshold amount of resources during a particular time period;
        responsive to the determination that the process is anomalous, monitor the argument regarding the anomalous process to determine if the anomalous process continues to be anomalous over time; and
        remediate the anomalous process by dynamically allocating computing resources to the VCI in response to the anomalous usage.

2. The system of claim 1, wherein the system includes a management server for the software defined data center; and
    wherein the monitoring agent is further configured to execute instructions to report the anomalous usage to the management server.

3. The system of claim 1, wherein the system includes a management server for the software defined data center; and
    wherein the monitoring agent is further configured to execute instructions to report the collected information regarding resources used by the top resource user associated with the anomalous usage to the management server.

4. The system of claim 1, wherein the system includes a management server for the software defined data center; and
    wherein the monitoring agent is further configured to execute instructions to report the collected information regarding resources used by the top resource users in the sliding window to the management server.

5. The system of claim 4, wherein the management server is configured to:
    further analyze the collected information; and
    report a result of the further analysis to an end user.

6. The system of claim 5, wherein the further analysis comprises sorting the plurality of processes that exhibit anomalous usage based, at least in part, on an amount of processing resources consumed by each process that exhibits anomalous usage among the plurality of processes.

7. The system of claim 5, wherein the further analysis includes analyzing at least an amount of processing resources consumed, an amount of memory resources consumed, and an amount of input/output resources consumed.

8. The system of claim 1, wherein dynamically allocating computing resources to the VCI further comprises terminating the anomalous process.

9. A method, comprising:
identifying, via a respective monitoring agent provisioned with a plurality of computing resources deployed in a software defined data center and ultimately executed by hardware and associated with each of a plurality of virtual computing instances (VCIs), anomalous processes running on respective VCIs among the plurality of VCIs, wherein the anomalous processes are processes that are consuming an amount of resources that is greater than a threshold amount of resources during a particular time period or are processes that are consuming resources sporadically;
collecting information regarding the amount of resources consumed, wherein the information regarding the resources used includes names of the processes, arguments associated with the processes, and resource consumption associated with the processes;
monitoring the arguments associated with the anomalous processes in response to identifying the anomalous processes to determine if the anomalous processes continue to be anomalous over time;
maintaining a sliding window of top resource users among the processes, wherein the sliding window includes the information regarding the resources for each of the top resource users;
analyzing the amount of resources consumed by each of the anomalous processes periodically in response to the determination that the amount of resources consumed by the anomalous processes exceeds the threshold resource consumption value or in response to the determination that the anomalous process is consuming resources sporadically; and
remediating the anomalous process by dynamically allocating computing resources to the VCIs in response to the determination that the amount of resources consumed by the anomalous processes exceeds the threshold resource consumption value.

10. The method of claim 9, further comprising monitoring, via the monitoring agent, the amount of resources consumed by the anomalous process by analyzing at least one performance metric associated with the amount of resources consumed by the anomalous process.

11. The method of claim 9 further comprising providing a sliding window including a configurable number of anomalous process based, at least in part, on the amount of resources consumed by each anomalous process; wherein anomalous processes among the configurable number of anomalous processes are displayed in the sliding window based, at least in part, on the amount of resources consumed by each anomalous process.

12. The method of claim 9, further comprising providing information associated with the amount of resources consumed by each anomalous process to a management VCI that is in communication with each of the respective monitoring agents.

13. The method of claim 12, further comprising providing, via the management agent, information associated with at least one anomalous process to a monitoring agent that is different than the respective monitoring agent that provided the information associated with the at least one anomalous process to the management VCI.

14. The method of claim 9, further comprising storing, for each of the anomalous processes, a process name, at least one argument associated with the process, and an amount of resources consumed by the process; and
monitoring each of the anomalous processes based, at least in part, on the at least one argument associated with the process and the amount of resources consumed by the process.

15. The method of claim 9, further comprising analyzing, via the respective monitoring agent, processes running on the respective VCI that are similar to the anomalous processes to determine if the processes that are similar to the anomalous processes are anomalous.

16. A system, comprising:
an anomalous process engine provisioned with a plurality of computing resources deployed in a software defined data center and ultimately executed by hardware to execute instructions to:
allocate resources to a plurality of virtual computing instances (VCIs);
monitor the resources allocated to the VCIs;
collect information regarding resources used by the VCIs, wherein the information regarding the resources used includes a name of the process, an argument associated with the process, and a resource consumption associated with the process;
determine that a resource allocated to the VCIs is an anomalous process, wherein the anomalous process is a process that is consuming an amount of resources that is greater than a threshold amount of resources during a particular time period;
responsive to the determination that the process is anomalous, monitor the argument regarding with the anomalous process to determine if the anomalous process continues to be anomalous over time;
receive an indication for each of a plurality of anomalous processes running on the plurality of VCIs; and
remediate at least one anomalous process by dynamically allocating resources to the VCI in response to the determination that the process is consuming the amount of resources that is greater than the threshold amount of resources during the particular time period;
a collection engine provisioned with a plurality of computing resources deployed in a software defined data center and ultimately executed by hardware to execute instructions to collect resource consumption metrics associated with the anomalous processes in response to the indication; and
an analysis engine provisioned with a plurality of computing resources deployed in a software defined data center and ultimately executed by hardware to execute instructions to:
maintain a sliding window of a configurable number of top resource users among the plurality of anomalous processes based, at least in part, on the resource consumption metrics, wherein the sliding window includes information regarding the resources for each of the top resource users; and
analyze the plurality of anomalous processes.

17. The system of claim 16, wherein the resource consumption metrics include processing resource consumption, memory resource consumption, and input/output (I/O) resource consumption.

18. The system of claim 16, wherein the collection engine is configured to collect advanced performance metrics, wherein advanced performance metrics include a measure of how often an anomalous process among the plurality of anomalous processes is consuming resources and how often the anomalous process among the plurality of anomalous processes is not consuming resources.

19. The system of claim 16, wherein the analysis engine is configured to monitor the plurality of anomalous processes to determine if the processes continue to be anomalous over time.

20. The system of claim 16, wherein the analysis engine is configured to:
   analyze processes that are similar to anomalous processes among the plurality of anomalous processes to determine if the processes that are similar are anomalous; and
   query a monitoring agent associated with a software defined data center to request information about the processes that are similar to the anomalous processes.

\* \* \* \* \*